United States Patent [19]

Silvey

[11] Patent Number: 4,698,138
[45] Date of Patent: Oct. 6, 1987

[54] DE-ENTRAINMENT CHIMNEY AND METHOD OF OPERATION

[75] Inventor: Frank C. Silvey, Plainsboro, N.J.

[73] Assignee: Mobil Oil Corporation, New York, N.Y.

[21] Appl. No.: 871,632

[22] Filed: Jun. 6, 1986

Related U.S. Application Data

[63] Continuation-in-part of Ser. No. 738,716, May 29, 1985, abandoned.

[51] Int. Cl.⁴ .............................................. B01D 3/10
[52] U.S. Cl. ...................................... 203/91; 202/158; 203/94; 261/114.2
[58] Field of Search ........... 261/109, 110, 113, 114 R, 261/114 A, 114 JP; 202/158; 203/91, 94; 55/25 TR, 25 NP, 259

[56] References Cited

U.S. PATENT DOCUMENTS

| | | | |
|---|---|---|---|
| 1,821,619 | 9/1931 | Day | 261/114 A X |
| 1,876,179 | 9/1932 | Tindall | 202/158 |
| 2,191,919 | 2/1940 | Thayer | 261/114 R X |
| 2,222,565 | 11/1940 | Kraft | 261/114 A X |
| 2,398,213 | 4/1946 | Dutson, Jr. et al. | 208/358 |
| 2,522,425 | 9/1950 | Baumann et al. | 261/114 A |
| 2,539,142 | 1/1951 | Kelley et al. | 261/114 R |
| 2,578,881 | 12/1951 | Dunn | 261/114 A |
| 2,681,218 | 6/1954 | Donovan | 261/114 R |
| 2,693,949 | 11/1954 | Huggins | 261/114 JP |
| 2,952,632 | 9/1960 | Oertling | 208/361 |
| 2,960,322 | 11/1960 | Eld | 202/158 X |
| 3,109,870 | 11/1963 | Kuhn et al. | 261/114 R |
| 3,445,095 | 5/1969 | Braun | 261/114 VT |
| 3,501,400 | 3/1970 | Brody | 208/361 |
| 3,524,731 | 8/1970 | Effron et al. | 261/113 X |
| 3,567,193 | 3/1971 | Diery et al. | 261/114 A |
| 4,060,399 | 11/1977 | Gleason | 261/114 R X |
| 4,159,291 | 6/1979 | Bruckert et al. | 261/114 R |
| 4,192,835 | 3/1980 | Powers | 261/114 R X |
| 4,233,269 | 11/1980 | Kaye et al. | 422/207 |
| 4,382,901 | 5/1983 | Thomas | 261/114 A |

FOREIGN PATENT DOCUMENTS

| | | | |
|---|---|---|---|
| 176208 | 6/1966 | Austria | 261/114 A |
| 534260 | 8/1958 | Belgium | 261/114 A |
| 881553 | 11/1961 | United Kingdom | 261/114 A |

Primary Examiner—Richard L. Chiesa
Attorney, Agent, or Firm—Alexander J. McKillop; Michael G. Gilman; Malcolm D. Keen

[57] ABSTRACT

An improved method and apparatus for de-entraining liquid droplets from a vaporous stream as it leaves a flash zone of a separation tower. The removal of the droplets is accomplished by a chimney which directs vapor flow through two direction changes of about 180° each. The chimney comprises a riser and hat which have an annulus between them. The cross-sectional area of the annulus is less than that of the cross-sectional area of the riser, so the momentum imparted to the entrained droplets drives them downwardly while the lighter vapor undergoes the second direction change and continues upwardly. The chimney may further reduce entrainment by having an extended portion of the riser below a plate and a lip attached to the inside perimeter of an opening of the riser above the tray. Preferably a lower portion of the riser has a larger cross-sectional area than an upper portion of the riser.

23 Claims, 12 Drawing Figures

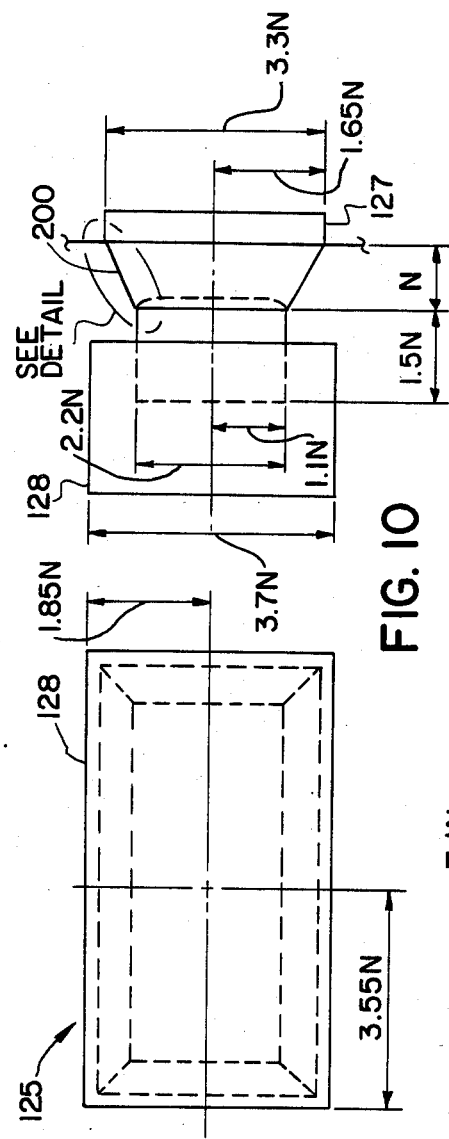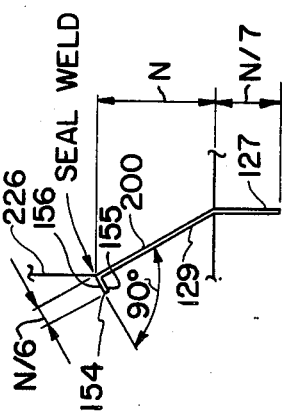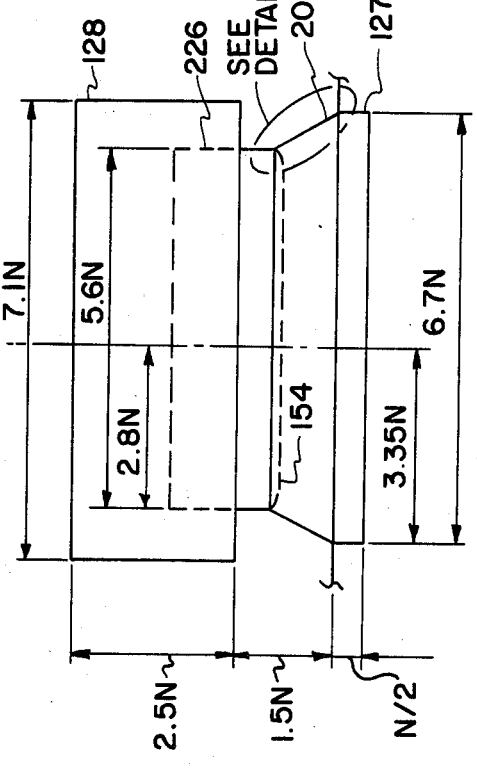

DE-ENTRAINMENT CHIMNEY AND METHOD OF OPERATION

Continuation-in-part of U.S. patent application Ser. No. 738,716, filed May 29, 1985, now abandoned.

BACKGROUND OF THE INVENTION

1. Field of the Invention

This invention relates to apparatus and methods for use above a separation unit flash zone to reduce entrainment of droplets of liquid entrained in a vaporous stream as it leaves the flash zone.

2. Discussion of the Prior Art

Separation units, such as atmospheric distillation units, vacuum distillation units and product strippers, are major processing units in a refinery. Atmospheric or vacuum distillation units separate crude oil into fractions according to boiling point so downstream processing units, such as hydrogen treating or reforming units, will have feedstocks that meet particular specifications. Higher efficiencies and lower costs are achieved if the crude oil separation is accomplished in two steps: first, the total crude oil is fractionated at essentially atmospheric pressure; second, a bottoms stream of high boiling hydrocarbons, which typically have an initial boiling point below about 800° F. (427° C.), is fed from the atmospheric distillation unit to a second distillation unit operating at a vacuum pressure. The bottoms stream from the atmospheric distillation is also known as topped crude.

The vacuum distillation unit typically separates the atmospheric unit bottoms into gas oil vapors catagorized as light gas oil having a boiling point between about 420° and about 610° F. (216°–320° C.), heavy gas oil having a boiling point between about 610° and about 800° F. (320°–427° C.), vacuum gas oil having a boiling range between about 800° and about 1050° F. (427°–566° C.), and vacuum reduced crude having a boiling point of about 1050° C.+ (566° C.). The vacuum reduced crude is also known as residuum and leaves the vacuum distillation unit as a liquid bottoms stream. Additional information concerning distillation is available in *Petroleum Refining Technology and Economics*, Gary, J. H. and Handwerk, G. E., pp. 31–51, Marcel Dekker, Inc. (1975).

The vacuum pressure allows the distillation unit to separate the atmospheric unit bottoms into fractions at lower temperatures than if separation were at atmospheric pressure. The high temperatures necessary to vaporize the atmospheric unit bottoms at atmospheric pressure cause thermocracking to occur, with loss in $C_5+$ yield due to formation of gas, discoloration of the product, and equipment fouling due to coke formation.

In atmospheric or vacuum distillation, lighter hydrocarbons are vaporized and separated from relatively heavier hydrocarbons. Although the heavier hydrocarbons do not vaporize, they may be carried into the lighter hydrocarbons because of entrainment.

Entrainment is undesirable because the entrained heavier hydrocarbons are typically contaminated with metals, such as vanadium or nickel, which can poison downstream catalytic processing, such as hydrotreating, hydrocracking, or fluid catalytic cracking, to which portions of the lighter hydrocarbons are typically fed. Most downstream catalytic processes employ fluid beds or fixed beds or catalyst. For example, a gas oil product, from a vacuum or atmospheric distillation column, may subsequently feed a fluid catalytic cracking unit. If there are metals contained in the feed to a fixed bed hydroconversion process, such as soluble or organometallic compounds, the bed will generally become increasingly plugged with metals as they deposit on the catalyst. These metals deposit themselves in the interstitial space between the catalyst particles, causing the pressure drop to increase. For either a fluid bed or fixed bed catalytic process, the depositing metals decrease the activity of the catalyst. Therefore, it is desirable to minimize metals, especially nickel and vanadium, which may adversely affect catalyst selectivity and life.

The metals enter lighter hydrocarbons, such as gas oil, by two routes: (1) by vaporization, because the organometallic compounds have a finite vapor pressure, although their vapor pressure is extremely low and by far the greatest amount of the metallic compounds are in the very heaviest fraction of the bottoms; and (2) by liquid entrained with the gas oil vapors. The elimination of entrainment can only eliminate the metals present in the gas oil via the second route. However, because of the low volatility of the metal compounds, reduction of entrainment should significantly reduce metals content in the lighter hydrocarbons and thus improve performance of downstream catalytic units.

In vacuum distillation, bottoms separated from crude oil by an atmospheric distillation unit are fed to a flash zone in the lower portion of the vacuum distillation unit. To reduce entrainment of residiuum from the flash zone, along with the lighter hydrocarbons, such as gas oil, a demister or wire mesh pad is frequently installed at some point between the flash zone and a gas oil draw-off. However, the demister or wire mesh pad is not completely satisfactory for a number of reasons:

(1) entrainment in many cases is not found to be significantly reduced;

(2) the pads have a tendency to plug with heavy oil and other material; and (3) the pads have a tendency to corrode, with holes resulting from the corrosion.

Methods other than the demister pads have been tried in the past to reduce the entrainment of residiuum into the gas oil, but these methods have met with only limited success. Employing a conventional bubble-cap tray above the flash zone causes the vapor to pass through liquid on the bubble-cap tray, thereby allowing vapor to re-entrain liquid droplets. These re-entrained droplets may contain less of the higher boiling components; however, their presence in the vapor stream is deleterious to good fractionation and downstream processing. In addition, the bubble-cap tray exhibits a pressure drop, thus increasing the flash zone pressure required to drive the vapor through the bubble-cap tray. Increased pressure is bad for vacuum distillation because it necessitates a higher flash zone temperature and prevents a deeper cut distillation.

The bubble-cap could be replaced by a standard chimney tray having a plurality of risers attached to a plate having holes, with a baffle attached to the top of each riser. Chimney trays are available which provide two 90° direction changes. A first 90° direction change when a stream from the riser contacts the baffle, and a second 90° direction change when the stream exits the chimney. These standard chimneys have a lower pressure drop than bubble-caps; however, they allow significant entrainment.

Liquid entrainment also reduces separation efficiency in other hydrocarbon and non-hydrocarbon services wherein feed entries are flashed. Typical services include produce strippers or towers which are fed a partially vaporized stream.

SUMMARY OF THE INVENTION

Accordingly, a primary object of the invention is to provide a method and apparatus for de-entraining droplets of liquids entrained in a vapor stream as it leaves a flash zone of a separating tower.

Another object of the invention is to provide a method and apparatus for directing a stream of vapor and entrained liquid droplets downwardly and allowing the vapor to turn upwardly and the liquid droplets to proceed downwardly, thus de-entraining the droplets from the vapor.

Another object of the invention is to provide a method and apparatus for increasing the momentum of liquid droplets in a stream containing vapor and liquid droplets to facilitate de-entraining the liquid droplets.

Another object of the invention is to reduce liquid entrainment from the underside of a tray into a chimney riser attached to the tray.

Another object of the invention is to reduce entrainment of liquid adhering to inside walls of the chimney riser into a vapor stream passing through the chimney riser.

The apparatus of the invention comprises a de-entrainment chimney for a tower plate having a hole therethrough, which comprises: a riser for passing a stream comprising vapor and liquid upwardly through the hole, wherein a portion of the riser extends upwardly from the plate and is attached to the plate at the perimeter of the hole, the riser having a first opening below the plate and a second opening located a distance above the plate; a hat for downwardly directing the stream from the riser second opening, comprising a top wall attached to side walls, the hat being located apart from the riser and a top portion of the riser being located within the hat to form an annulus in open communication with the atmosphere of the tower, the annulus forming a means for passing the stream downwardly from the hat, the cross-sectional area of the annulus is less than the cross-sectional area of the riser to increase the speed of the stream through the annulus relative to its speed through the riser; the hat allowing the vapor portion of the downward stream from the annulus to turn upwardly, thereby de-entraining a major portion of the liquid from the stream.

In its method respects, the invention comprises the steps of: upwardly passing a stream, comprising liquid and vapor through a hole of a plate in a tower; passing the stream through a riser, wherein a portion of the riser extends upwardly from the plate and is attached to the plate at the perimeter of the hole, the stream enters through a first opening of the riser below the plate and exits upwardly through a second opening of the riser located a distance above the plate; contacting the upward stream with a hat to direct the stream downwardly, wherein the hat comprises a top wall attached to side walls, the hat being located apart from the riser and a top portion of the riser being located in the hat to form an annulus; passing the stream through the annulus at a higher velocity than it passes through the riser; passing the downward stream from the annulus directly into the atmosphere of the tower; directing the vapor portion of the downward stream from the annulus upwardly to de-entrain the liquid portion from the stream.

Furthermore, the plate has a layer of liquid on its upper surface but the hat is located a distance above the layer so the stream passes from the annulus directly into the atmosphere of the tower. The stream does not bubble through the liquid layer, as in a bubble-cap design. Preferably, the riser first opening is located a distance below the plate to reduce entrainment of liquid into the riser and a lip is attached to the inner perimeter of the riser second opening to reduce entrainment of liquid out of the riser. In addition the two changes in direction of the stream are preferably about 180° each.

The present invention may also include tapering the chimney riser so that the lower portion of the chimney riser is wider than the upper portion of the chimney riser.

The invention improves performance of processing downstream of an atmosphere distillation unit or vacuum distillation unit because it reduces the entrainment of bottoms which contain impurities into the desired lighter hydrocarbon fractions, such as gas oil, thereby improving the quality of these lighter hydrocarbon fractions which are fed to subsequent downstream processing, such as hydrotreating or fluid catalytic cracking. The device is generally beneficial to increase separation efficiencies in hydrocarbon and non-hydrocarbon services wherein feed entries are flashed. The device is particularly useful in vacuum towers because of its low pressure drop which is typically one-third that of a bubble cap.

Tapering the chimney riser further reduces pressure drop because the lower portion of the tray is wider than if the riser were of uniform diameter, so the upwardly passing stream passe into a wider riser.

BRIEF DESCRIPTION OF THE DRAWINGS

FIG. 5 is a detailed top view of the chimney of the present invention;

FIG. 6 is a cross-sectional side view along view B—B of the chimney of the present invention;

FIG. 7 is the chimney of FIG. 6 and shows the vapor flow path through the chimney;

FIG. 8 is a portion of a cross-section of the tower employing the chimney of the present invention, wherein the tray is tilted;

FIG. 9 is a detailed top view of another embodiment of the chimney of the present invention;

FIG. 10 is a side view of the chimney of FIG. 9;

FIG. 11 is another side view of the chimney of FIG. 9; and

FIG. 12 is a detailed view of a portion of the chimney circled in FIGS. 10 and 11.

PREFERRED EMBODIMENTS OF THE INVENTION

The present invention is directed toward the method and apparatus for de-entraining. It employs a de-entrainment chimney for a tray above the flash zone of an atmospheric or vacuum distillation tower. The purpose of the invention is to remove droplets of high boiling liquid entrained in the vapor stream as it leaves the flash zone. The removal of these droplets is accomplished by the designed features of the device, which direct the vapor flow through two direction changes of about 180° each. A stream of vapor and high boiling liquids passes upwardly through the chimney, then is turned downwardly and the liquid droplets continue downwardly while the vapor turns upwardly, thus de-entraining the liquid from the vapor.

Figure 1:
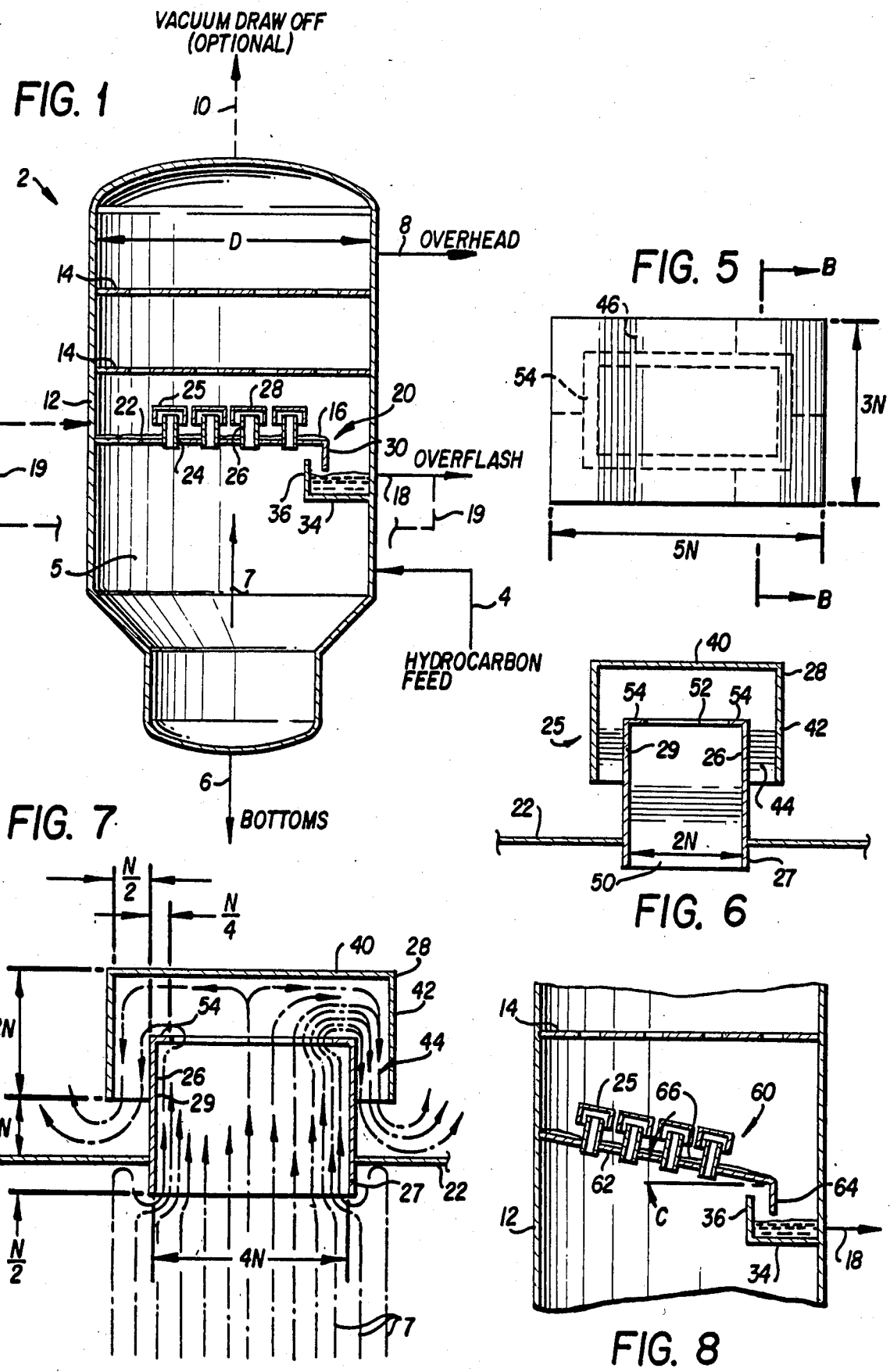
FIG. 1 is a cross-section of a tower employing the chimney of the present invention.
Figure 2:
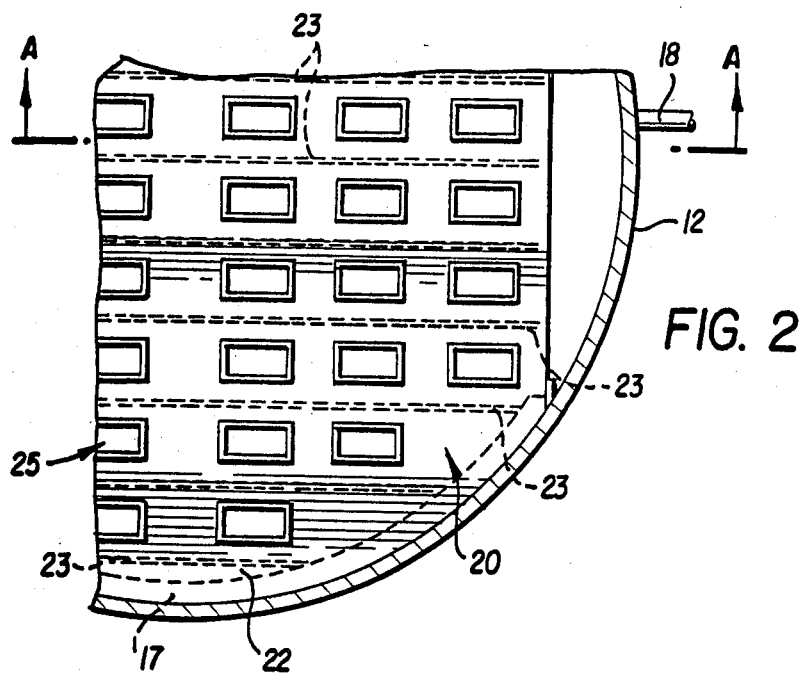
FIG. 2 is a top view of a portion of a tower tray employing the chimney of the present invention.
Figure 3:
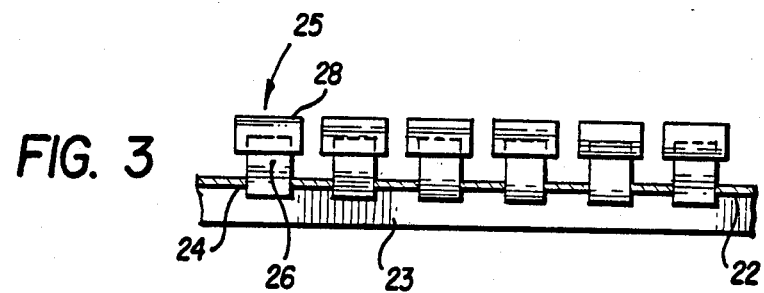
FIG. 3 is a side view of a portion of the tower tray employing the chimney of the present invention.
Figure 4:
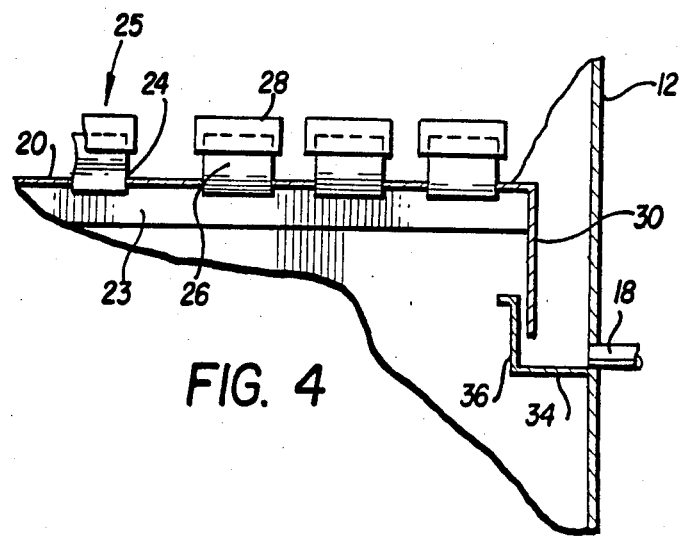
FIG. 4 is a cross-sectional side view of FIG. 2 along view A—A.

FIG. 1 shows a schematic diagram of a tower 2 employing the chimney of the present invention. Hydrocarbon feed passes through a conduit 4 into the flash zone 5 in the lower portion of the tower 2. In the tower 2, the feed is separated into heavier hydrocarbons which pass through a bottoms conduit 6 and lighter hydrocarbons which pass through an overhead conduit 8. The present invention is described as employed by the tower 2, which may be provided with a vacuum draw-off 10 to operate as a vacuum tower. However, the invention is also applicable to an atmospheric tower and other hydrocarbon and non-hydrocarbon services wherein feed entries are flashed. Typical services include a catalytic hydrodesulfurization (CHD) product stripper, a carbonate regenerator in a Benfield $CO_2$ removal unit, or other product strippers. The tower 2 may be provided with conventional trays 14 or other conventional tower internals, such as packing (not shown). The tower 2 is also provided with a de-entrainment chimney tray 20 above the flash zone 5. The de-entrainment tray 20 is provided with a plate 22 having holes 24 therein. Each hole 24 is provided with a chimney 25, which includes a riser 26 and a hat 28. The riser 26 is attached to the perimeter of the hole 24. Four chimneys 25 are shown in FIG. 1, but typically more chimneys 25 are employed on the plate 22, as shown in FIGS. 2-4. The plate 22 is attached to sidewalls 12 of the tower 2 by a support ring 17, shown by FIG. 2. Trusses 23 may be attached to the underside of the plate 22 to provide support. The tray 20 is also provided with a downcomer 30 attached to the plate 22, as shown by FIG. 1. Optionally, the tray 30 may be provided with a conduit 19 to recycle a portion of overflash.

As shown in FIG. 8, a tray 60 is provided with de-entrainment chimneys 25, and a plate 62 which may be tilted slightly towards a downcomer 64. Thus, the portion of the plate 62 away from the downcomer 64 is elevated slightly higher than the portion of the plate 62 attached to the downcomer 64. Tilting the plate 62 improves the washing of a liquid layer 66 from the upper surface of the tilted plate 62. The liquid layer 66 includes de-entrained droplets and liquid from the trays 14 (one shown in FIG. 8) located above the tray 60. The plate 62 is tilted by an angle C. Angle C is exaggerated in FIG. 8 to show its detail; however, it is typically less than about 1°. The de-entrainment chimneys 25 are perpendicular to the plate 62.

In an example of the embodiment of FIG. 1, the tower 2 operates at vacuum pressure. Hydrocarbon feed passes through conduit 4 into the flash zone 5 of the tower 2. The hydrocarbon feed typically has a boiling point higher than about 610° F. (320° C.). The feed flashes in zone 5 to form a hydrocarbon stream 7, typically comprising gas oil vapor and entrained droplets of vacuum reduced crude. Typically, gas oil vapors include light gas oil having a boiling point between about 420° and about 610° F. (216°-320° C.), heavy gas oil having a boiling point between about 610° and about 800° F. (320°-427° C.) and vacuum gas oil having a boiling range between about 800° and about 1050° F. (427°-566° C.). The vacuum reduced crude has a boiling point of about 1050° F. (566° C.). The vacuum reduced crude is also known as residuum and leaves the vacuum distillation unit as the liquid bottoms stream 6. Additional information concerning distillation is available in *Petroleum Refining Technology and Economics,* discussed above. The stream 7 passes upwardly into the riser 26. As shown in more detail by FIGS. 6-7, the hydrocarbon stream 7 passes upwardly into a first opening 50 of the riser 26 and exits the riser 26 through a second opening 52 to contact the hat 28. The hat 28 includes a top wall 40 attached to a sidewall 42, wherein the top wall 40 and sidewall 42 are located a distance from the riser 26. As shown in FIG. 5, supports 46 space the hat 28 from the riser 26. Both the hat 28 and the riser 26 are attached to the supports 46. A portion of the riser 26 is located within the hat 28 to form an annulus 44 and to allow vapor to pass between the riser 26 and the hat 28. The stream 7 passes upwardly from the second opening 52, is then directed downwardly by the hat 28 and exits from the hat 28 through Iannulus 44 directly into the atmosphere of the tower 2. The longitudinal axis of the riser 26 is preferably parallel to the cap sidewalls 42, so the hat 28 may change the direction of the stream exiting the riser 26 by about 180°. The cross-sectional area of the annulus 44 is less than the cross-sectional area of the riser 26. Therefore, the stream 7 has a higher velocity when passing through the annulus 44 than in the riser 26 to increase the momentum of droplets of liquid.

The momentum of the droplets exiting the annulus 44 propels them toward the plate 22, while the lighter vapor undergoes a second direction change and turns upwardly due to conventional physical forces. The sidewalls 42 are preferably perpendicular to the plate 22, so the direction change after stream 7 exits the annulus 44 is about 180°. Subsequently, the de-entrained droplets are washed across the upper surface of the plate 22 by liquid descending from distillation devices, such as the trays 14 above. The liquid, from above and from the droplets, forms a liquid layer 16 on the upper surface of the plate 22, and the liquid is removed from the tower 2 by passing along the downcomer 30 into a trough formed by a weir 36 attached to a member 34, as shown in FIG. 4. This liquid forms the overflash which exits the tower 2 through conduit 18. The annulus 44 is located above the liquid layer 16 so the stream 7 passes from the annulus 44 directly into the atmosphere of the tower 2. The vapor portion of the stream 7 does not bubble through the liquid layer 16, as would vapor exiting a bubble-cap.

The portion of stream 7 that impinges the plate 22 between the risers 26 will de-entrain some liquid. Therefore, the riser 26 may extend below the plate 22 to form an extension 27 that prevents the liquid from being re-entrained up the riser 26. As shown in FIG. 7, the vapor portion of the upward stream 7 can deflect itself from the plate 22, around the extension 27 and into the riser 26.

The riser 26 may also be provided with a lip 54, as shown in FIGS. 5-7, which prevents drops of liquid, adhering to an inside wall 29 of the riser 26, from creeping up the wall 29 and being re-entrained into the stream 7 passing through the riser 26.

FIGS. 5 and 6 also provide typical dimensions for the various members of the chimney 25. The sizes of these members are related to "N", which is the inside diameter "D" of the tower 2 divided by 50. Although these ratios are for an embodiment of a commercial-size tower 2, these ratios could vary depending upon tower geometry and difficulty of de-entrainment. For example, the cross-sectional area of the annulus 44 could be varied. The riser 26 and hat 28 are shown as being rectangular. However, other shapes could be employed depending upon tower geometry requirements.

A tray employing the de-entrainment chimney of the present invention has many advantages over the prior art. The de-entrainment chimney tray provides more efficient de-entrainment than a conventional bubble-cap tray. A conventional bubble-cap tray causes the vapor to pass through the liquid on the bubble-cap tray, thereby allowing vapor to re-entrain liquid droplets. These re-entrained droplets may contain fewer high boiling point components; however, their presence in the vapor stream can be deleterious to good fractionation and contaminate downstream processing. In addition, the bubble-cap tray exhibits a pressure drop about three times higher than the de-entrainment chimney tray. Thus, the low pressure drop in the present invention allows a lower flash zone pressure and can be utilized to obtain a deeper distillate cut or lower the flash zone temperature.

The present invention would have advantages over a tray having standard chimneys with two 90° direction changes. Although the standard chimeny has a somewhat lower pressure drop than the de-entrainment chimney of the present invention, the standard chimney does not remove entrained droplets effectively.

FIGS. 9-12 show another embodiment of a chimney of the present invention. As seen in these Figures, the riser of chimney 125 comprises base 127, reducer 200 and upper conduit 226 beneath hat 128. Hats 128 must be located at least a minimum distance apart to account for tray geometry and provide space for gas to pass upwardly after de-entrainment. This embodiment takes advantage of the tray area under the hat to provide greater area for upwardly passing gas and entrained liquid to pass therethrough.

Lip 154, as best seen in FIG. 12, prevents drops of liquid, adhering to inside wall 129 of reducer section 200 from creeping up the wall and being re-entrained into the vapor stream passing through the upper conduit 226.

The advantage of the configuration of chimney 125, as shown in FIGS. 9-12, is that a significantly greater portion of the de-entrainment chimney tray can be open space. Almost 50% open tray area or open space can be achieved using the configuration shown in FIGS. 9-12. This is possible because the cap 128 is only very slightly larger than the base section 127. Accordingly, this embodiment has lower pressure drop than embodiments having a riser of uniform cross-section.

In another embodiment, not shown, the de-entrainment chimney can have a substantially circular shape, rather than the rectangular shape shown in the drawings.

In FIG. 12 inner lip 154 may conveniently be formed from two parts 155, 156. Part 155 would be attached to the upper portion of the reducer 200 and part 156 would be attached to the lower portion of the upper conduit 226. These parts 155, 156 would be clamped to each other and then preferably seal welded together. Preferably, there is a 90° angle between lip 154 and inner wall 129 of reducing section 200. Lip 154 preferably extends a distance N/6 in from the inner wall 129.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. In combination with a flash zone a de-entrainment chimney apparatus for a tower plate having a hole therethrough comprising:

a riser positioned downstream of said flash zone for passing a stream comprising vapor and liquid upwardly through said hole, wherein a portion of said riser extends upwardly from said plate and is attached to said plate at the perimeter of said hole, said riser having a first opening below said plate and a second opening located a distance above said plate, said plate adapted to have a layer of liquid on its upper surface;

a hat for downwardly directing said stream from said riser second opening, and comprising a top wall attached to sidewalls, said hat being located a distance above said layer and located apart from said riser and a top portion of said riser being located within said hat to form an annulus in open communication with the atmosphere of said tower, said annulus forming a means for passing said stream downwardly from said hat, the cross-sectional area of said annulus being substantially constant and less than the cross-sectional area of said riser at said second opening to increase the speed of said stream through said annulus relative to its speed through said second opening of said riser, said sidewalls of said hat spaced above said plate so as to allow said vapor portion of said downward stream from said annulus to turn upwardly, thereby de-entraining a major portion of said liquid from said stream.

2. The apparatus of claim 1, wherein said first opening is located a distance below said plate.

3. The apparatus of claim 2, further comprising a lip attached to the inner perimeter of said riser second opening.

4. The apparatus of claim 3, wherein said hat sidewalls are substantially parallel to the longitudinal axis of said riser and the cross-sectional area of said annulus is substantially constant.

5. The apparatus of claim 4, wherein said tower is a vacuum tower.

6. The apparatus of claim 4, further comprising a downcomer wherein the portion of said plate away from said downcomer is elevated relative to the portion of said plate attached to said downcomer.

7. The apparatus of claim 6, wherein said plate is tilted between 0° and about 1° from horizontal.

8. The apparatus of claim 4, further comprising means for removing a portion of said liquid on said upper surface of said plate from said plate and means for recycling a portion of said removed liquid back to the upper surface of said plate.

9. The apparatus of claim 1, wherein said riser comprises a base connected to a reducer and an upper conduit connected to said reducer, said upper conduit having a smaller cross-sectional area than said base, said base having said first opening and said upper conduit having said second opening.

10. The apparatus of claim 9, further comprising a lip attached to an inner perimeter of said riser, said lip being spaced away from said first opening of said riser.

11. In combination with a flash zone a de-entrainment chimney apparatus for a tower plate having a hole therethrough, comprising:

a riser positioned downstream of said flash zone for passing a stream comprising vapor and liquid through said hole, wherein a portion of said riser extends upwardly from said plate and said riser is attached to said plate at the perimeter of said hole, said riser having a first opening located a distance below said plate and a second opening located a distance above said plate;

a lip attached to the inner perimeter of said riser second opening so as to diminish the cross-sectional area of said riser;

a hat for downwardly directing said stream from said riser, wherein said hat comprises a top wall attached to the longitudinal axis of said riser, said hat being located apart from said riser and a top portion of said riser being located within said hat to form an annulus in open communication with the atmosphere of said tower, said annulus forming a means for passing said stream downwardly from said hat, said plate adapted to have a layer of liquid on its upper surface and said hat being spaced apart from said layer, the cross-sectional area of said annulus being substantially constant and less than said diminished cross-sectional area of said riser in the vicinity of said lip to increase the speed of said stream through said annulus relative to its speed through said riser, said hat allowing said vapor portion of said downward stream from said annulus to turn upwardly, thereby de-entraining a major portion of said liquid from said stream.

12. A method of de-entraining liquid from a stream comprising liquid and vapor in a tower downstream of a flash zone, comprising the steps of:

upwardly passing said stream through a hole of a plate in said tower;

passing said stream through a riser positioned downstream of said flash zone, wherein a portion of said riser extends upwardly from said plate and is attached to said plate at the perimeter of said hole, said stream enters through a first opening of said riser below said plate and exits upwardly through a second opening of said riser located a distance above said plate, said plate having a layer of liquid on its upper surface;

contacting said upward stream with a hat to direct said stream downwardly, wherein said hat comprises a top wall attached to sidewalls, said hat being spaced a distance above said layer of liquid and located apart from said riser and a top portion of said riser being located within said hat to form an annulus having a cross-sectional area which is substantially constant and less than the cross-sectional area of said riser at said second opening;

passing said downward stream through said annulus at a higher velocity than it passes through said second opening of said riser;

passing said downward stream from said annulus directly into the atmosphere of said tower; and directing said vapor portion of said downward stream from said annulus upwardly to de-entrain the liquid portion from said stream.

13. The method of claim 12, wherein said layer comprises said de-entrained liquid.

14. The method of claim 13, wherein said stream passes through said first opening located a distance below said plate.

15. The method of claim 14, further comprising passing said stream across a lip attached to the inner perimeter of said riser second opening.

16. The method of claim 15, wherein said hat changes the direction of said upward riser stream by about 180°.

17. The method of claim 16, wherein said tower operates at vacuum pressure.

18. The method of claim 16, further comprising passing said liquid from said upper surface of said plate to a downcomer attached to said plate, wherein said liquid on the portion of said plate away from said downcomer is elevated relative to the portion of said plate attached to said downcomer.

19. The method of claim 18, wherein said liquid on the portion of said plate away from said downcomer is elevated between 0° and about 1° away from horizontal relative to the portion of said plate attached to said downcomer.

20. The method of claim 16, further comprising removing a portion of said liquid on said upper surface of said plate and recycling a portion of said removed liquid back to the upper surface of said plate.

21. The method of claim 12, wherein said riser comprises a base, a reducer and an upper conduit and said stream passes through said base, reducer and upper conduit in series and said stream has a lower velocity in said base than in said upper conduit.

22. The method of claim 21, wherein said stream passes over a lip attached to an inner perimeter of said riser, said lip being spaced away from said riser first opening.

23. A method of de-entraining liquid from a stream comprising liquid and vapor in a tower downstream of a flash zone, comprising the steps of:

upwardly passing said stream through a hole of a plate in said tower;

passing said stream through a riser positioned downstream of said flash zone, wherein a portion of said riser extends upwardly from said plate and said riser is attached to said plate at the perimeter of said hole, said stream enters through a first opening of said riser located a distance below said plate and exits upwardly through a second opening of said riser located a distance above said plate, said plate having a layer of liquid on its upper surface, wherein said riser comprises a lip attached to the inner perimeter of said second opening;

contacting said upward stream with a hat to direct said stream downwardly by changing the direction of said upward stream by about 180°, wherein said hat comprises a top wall attached to sidewalls, said hat being spaced a distance above said layer of liquid and spaced apart from said riser and a top portion of said riser being located within said hat to form an annulus having a cross-sectional area which is substantially constant and less than the cross-sectional area of said riser at said second opening in the vicinity of said lip;

passing said downward stream through said annulus at a higher velocity than it passes through said riser;

passing said downward stream from said annulus directly into the atmosphere of said tower; and directing said vapor portion of said downward stream from said annulus upwardly to de-entrain liquid from said stream.

* * * * *